(12) United States Patent
Depay

(10) Patent No.: US 7,717,374 B2
(45) Date of Patent: May 18, 2010

(54) KEYBOARD PALM REST ASSEMBLY

(75) Inventor: Dean Depay, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 68 days.

(21) Appl. No.: 12/011,289

(22) Filed: Jan. 25, 2008

(65) Prior Publication Data

US 2009/0189028 A1  Jul. 30, 2009

(51) Int. Cl.
*B68G 5/00* (2006.01)

(52) U.S. Cl. .................. 248/118; 403/715; 248/118.1

(58) Field of Classification Search .......... 248/118, 248/118.1, 918; 400/715, 719; 361/FOR. 106; 108/43; 403/472, 473, 474, 475, 476, 478, 403/479, 480, 481, 482, 483–496
See application file for complete search history.

(56) References Cited

U.S. PATENT DOCUMENTS

| | | | |
|---|---|---|---|
| 4,103,362 A * | 8/1978 | Blakeman ................. 2/161.1 |
| 5,244,296 A | 9/1993 | Jensen |
| 5,445,349 A | 8/1995 | Hart |
| 5,467,950 A | 11/1995 | Dumitru |
| 5,467,952 A | 11/1995 | Martin |
| 5,478,034 A * | 12/1995 | Cunningham et al. .... 248/118.5 |
| 5,492,291 A | 2/1996 | Otani |
| 5,547,154 A * | 8/1996 | Kirchhoff et al. ........ 248/118.3 |
| 5,601,264 A | 2/1997 | Peart |
| 5,730,711 A | 3/1998 | Kendall et al. |
| 5,803,416 A | 9/1998 | Hanson et al. |
| 5,828,034 A | 10/1998 | Chang |
| 5,954,303 A | 9/1999 | Wolf et al. |
| 5,971,331 A | 10/1999 | Getsay |
| 5,980,143 A * | 11/1999 | Bayer et al. ............... 400/715 |
| 6,017,006 A | 1/2000 | Cherubini et al. |
| 6,027,080 A | 2/2000 | Sziraki |
| 6,161,805 A | 12/2000 | Wells |
| 6,179,254 B1 | 1/2001 | Min-Chen |
| 6,216,988 B1 * | 4/2001 | Hsu et al. ................. 248/118 |
| 6,244,547 B1 | 6/2001 | Tonizzo et al. |
| 6,247,672 B1 | 6/2001 | Bello |
| 6,336,614 B1 * | 1/2002 | Kwitek ..................... 248/118 |
| 6,428,229 B2 | 8/2002 | Udo et al. |
| 6,446,920 B1 | 9/2002 | Wells et al. |
| 6,452,791 B2 | 9/2002 | Kim |
| 6,478,266 B1 | 11/2002 | Tsau |
| 6,488,244 B2 | 12/2002 | Ruan et al. |
| 6,499,703 B2 | 12/2002 | Chou |
| 6,547,193 B2 | 4/2003 | Money et al. |
| 6,618,242 B2 | 9/2003 | Garel et al. |
| 6,619,597 B1 | 9/2003 | Sheppard |
| 6,626,403 B1 | 9/2003 | Wolf et al. |
| 6,644,605 B1 | 11/2003 | Tyner |
| 6,672,548 B1 | 1/2004 | Yates |
| 6,843,454 B2 * | 1/2005 | Wolf et al. ............... 248/118.1 |
| 6,887,005 B2 | 5/2005 | Kim |
| 6,951,325 B2 | 10/2005 | Lopez-Apodaca |

(Continued)

*Primary Examiner*—A. Joseph Wujciak, III

(57) ABSTRACT

A keyboard palm rest assembly comprises a frame having an opening therethrough, the opening located corresponding to a position of a palm of a user when the user is utilizing a keyboard located adjacent the opening. The keyboard palm rest assembly also comprises a panel coupled to the frame and disposed across the opening, the panel enabling an airflow therethrough from a side opposite the user's palm to a side corresponding to the user's palm.

19 Claims, 4 Drawing Sheets

U.S. PATENT DOCUMENTS

| | | |
|---|---|---|
| 7,108,234 B2 | 9/2006 | Ritchey et al. |
| 7,300,026 B2 * | 11/2007 | Pap .......................... 248/118 |
| 2001/0000109 A1 * | 4/2001 | Kim .......................... 248/118 |
| 2002/0079410 A1 | 6/2002 | Kochanski |
| 2002/0166927 A1 | 11/2002 | Kollar |
| 2004/0035986 A1 | 2/2004 | Wolf et al. |
| 2004/0144900 A1 | 7/2004 | Sheppard |
| 2005/0184204 A1 | 8/2005 | Lopez-Apodaca |
| 2007/0001066 A1 | 1/2007 | Lane |

* cited by examiner

KEYBOARD PALM REST ASSEMBLY

BACKGROUND

Keyboards in the form of alphanumeric keypads, gaming keyboards and/or controllers, etc., are used to input data to various types of computing devices (e.g., computers, gaming consoles, etc.). In operation, a users hands tend to rest on or near the keyboard. However, such computing devices and/or the keyboards themselves can generate and/or conduct heat, which may lead to discomfort during the use of such keyboards.

BRIEF DESCRIPTION OF THE DRAWINGS

For a more complete understanding of the present disclosure, and the objects and advantages thereof, reference is now made to the following descriptions taken in connection with the accompanying drawings in which.

DETAILED DESCRIPTION OF THE DRAWINGS

Various embodiments of the present disclosure and the advantages thereof are best understood by referring to FIGS. 1-4 of the drawings, like numerals being used for like and corresponding parts of the various drawings.

Figure 1:
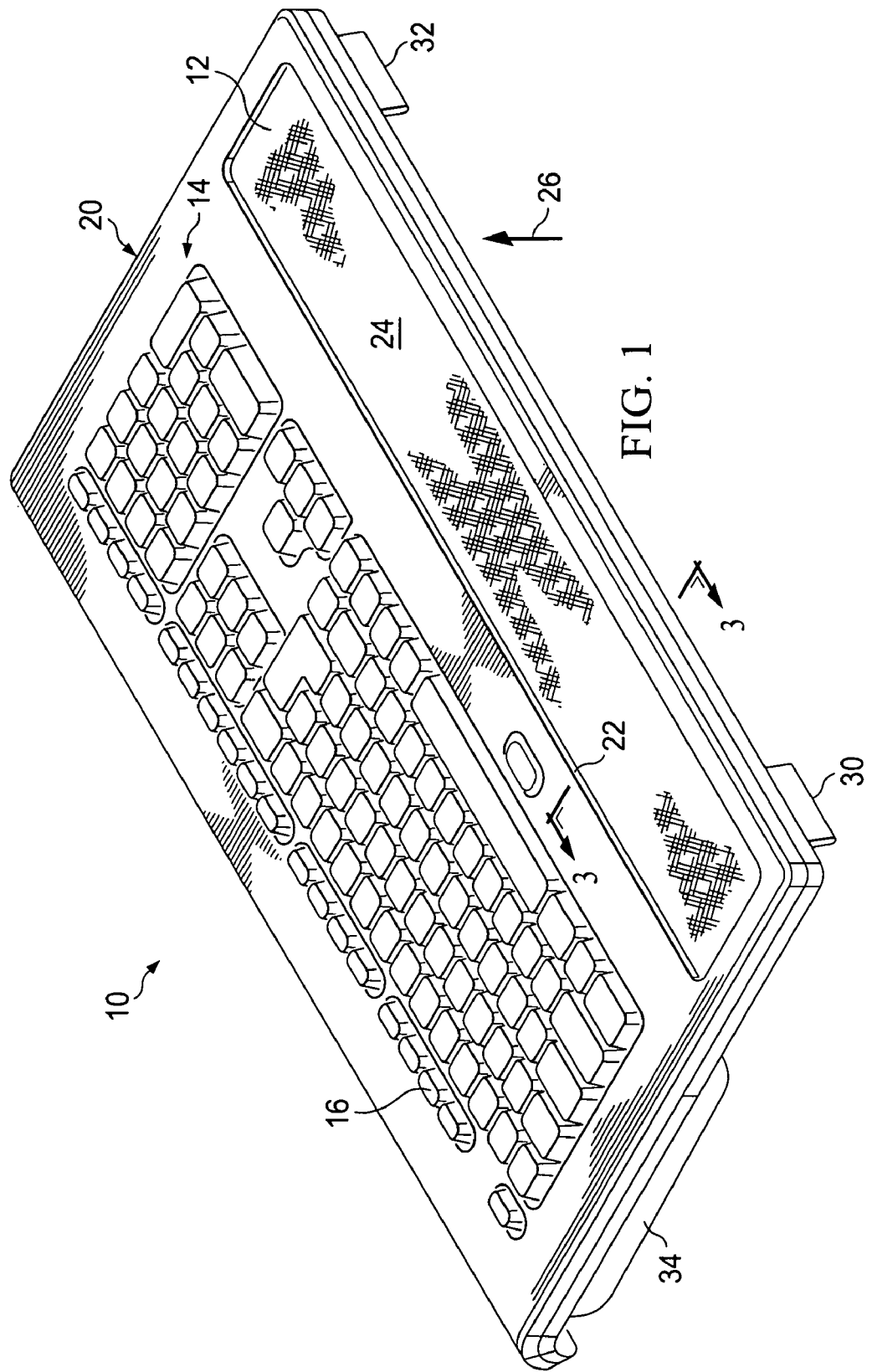
FIG. 1 is a diagram illustrating an embodiment of a keyboard palm rest assembly.

FIG. 1 is a diagram illustrating an embodiment of a keyboard palm rest assembly 10. In the embodiment illustrated in FIG. 1, assembly 10 comprises a breathable and/or air-permeable panel 12 located adjacent to a keyboard 14. In FIG. 1, keyboard 14 comprises an alphanumeric keypad 16 typically used to input data into a computing device and the like; however, it should be understood that other types of key-based input devices may be used such as, but not limited to, a gaming keyboard and/or controller, a numeric keypad, and a touch-sensitive keypad.

In the embodiment illustrated in FIG. 1, assembly 10 comprises a frame 20 having an opening 22 therein such that opening 22, and correspondingly panel 12, are located adjacent to and forward of keyboard 14 in a position corresponding to a position of a user's palms when a user is utilizing keyboard 14. Panel 12 is configured to enable an airflow therethrough to provide cooling and/or ventilation directed toward the user's palms. For example, in operation, when utilizing keyboard 14, a user's palms are generally located on and/or near a surface or side 24 of panel 12. Panel 12 is configured to enable an airflow upwardly therethrough in the direction generally indicated by arrow 26 to facilitate cooling and/or ventilation directed toward the user's palms. However, it should be understood that an airflow may pass through panel 12 in a direction opposite direction 26 also, thereby facilitating removal of heat from the user's palms.

In FIG. 1, supports 30, 32 and 34 are used to elevate at least a portion of assembly 10 located near panel 12 above a support surface to provide an airflow path to panel 12. For example, supports 30 and 32 may comprises rotatable and/or extendible supports 30 and 32 that may be rotated outwardly and/or otherwise extended to lift a forward portion of assembly 10 above a support surface. However, it should be understood that assembly 10 may be otherwise configured to enable an airflow path to panel 12 (e.g., from a rearward portion of frame 20 to panel 12, from side portions of frame 20 to panel 12, etc.). In FIG. 1, frame 20 is configured such that panel 12 and keyboard 14 are formed as an integral unit (e.g., keyboard 14 and panel 12 forming a unitary keyboard assembly); however, it should be understood that panel 12 may be manufactured as a separate and/or discrete component that may be located adjacent to and/or coupled to keyboard 14 (e.g., panel 12 formed as a separate component that may be coupled to a forward portion of keyboard 14). Further, in the embodiment illustrated in FIG. 1, assembly 10 is configured as an independent input device (e.g., couplable to a computing device via a wired or wireless connection); however, it should be understood that assembly 10 may be otherwise configured (e.g., formed as an integral component of a notebook or laptop computer).

Figure 2:
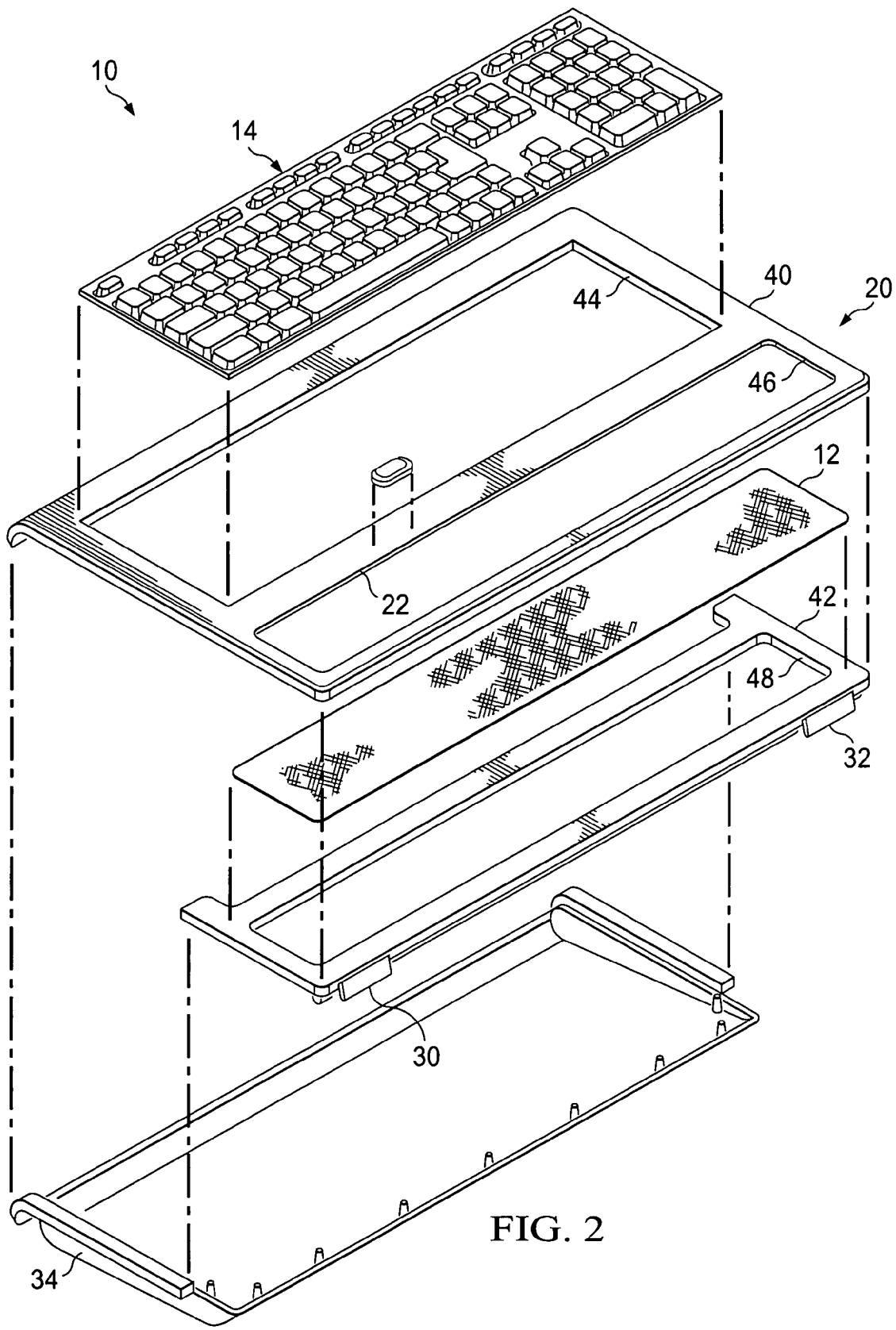
FIG. 2 is a diagram illustrating an exploded view of the keyboard palm rest assembly of FIG. 1.

FIG. 2 is a diagram illustrating an exploded view of assembly 10 of FIG. 1. In the embodiment illustrated in FIG. 2, frame 20 comprises an upper frame member 40 and a lower frame member 42. Upper frame member 40 comprises an opening 44 for receiving installation of keyboard 14 therein such that upper frame member 40 supports and/or otherwise positions keyboard 14 at a particular location relative to a location of panel 12. In FIG. 2, upper frame member 40 comprises an opening 46, and lower frame member 42 comprises an opening 48, such that openings 46 and 48 are generally aligned with each other when upper and lower frame members 40 and 42 are coupled together.

In operation, at least a portion of panel 12 is located between upper frame member 40 and lower frame member 42 such that, when upper frame member 40 and lower frame member 42 are brought together and/or are otherwise coupled to each other, a portion of panel 12 is sandwiched therebetween and panel 12 is located to extend across openings 46 and 48. Panel 12 may comprise a fabric panel 12 of a woven or non-woven material (natural or man-made) to enable an airflow to pass therethrough. Panel 12 may also be formed from a non-fabric material such as, but not limited to, a fine wire mesh. In some embodiments, panel 12 is configured to be flexible and/or stretchable such that panel 12 may be extended tautly across openings 46 and 48 to form a generally planar support surface for the user's hands/palms. Further, panel 12 may be formed of a single layer of material or multiple layers of material (e.g., multiple air-permeable layers of material used to obtain additional support strength).

Thus, in operation, panel 12 is configured to support a user's palms while utilizing keyboard 14 while also providing cooling and/or ventilation directed toward the user's palms. Upper frame member 40 may be coupled to lower frame member 42, and upper and lower frame members 40 and 42 may be coupled to support 34, using any of a variety of methods and/or mechanisms such as, but not limited to, fasteners, hooks, snap-fit elements, and adhesives. In FIGS. 1 and 2, a single panel 12 is illustrated extending substantially an entire lateral dimension of frame 20 near keyboard 14. However, it should be understood that multiple separate and/or spaced-apart panels 12 may be used (e.g., a separate panel 12 located corresponding to a location of each hand/palm of a user).

Figure 3:
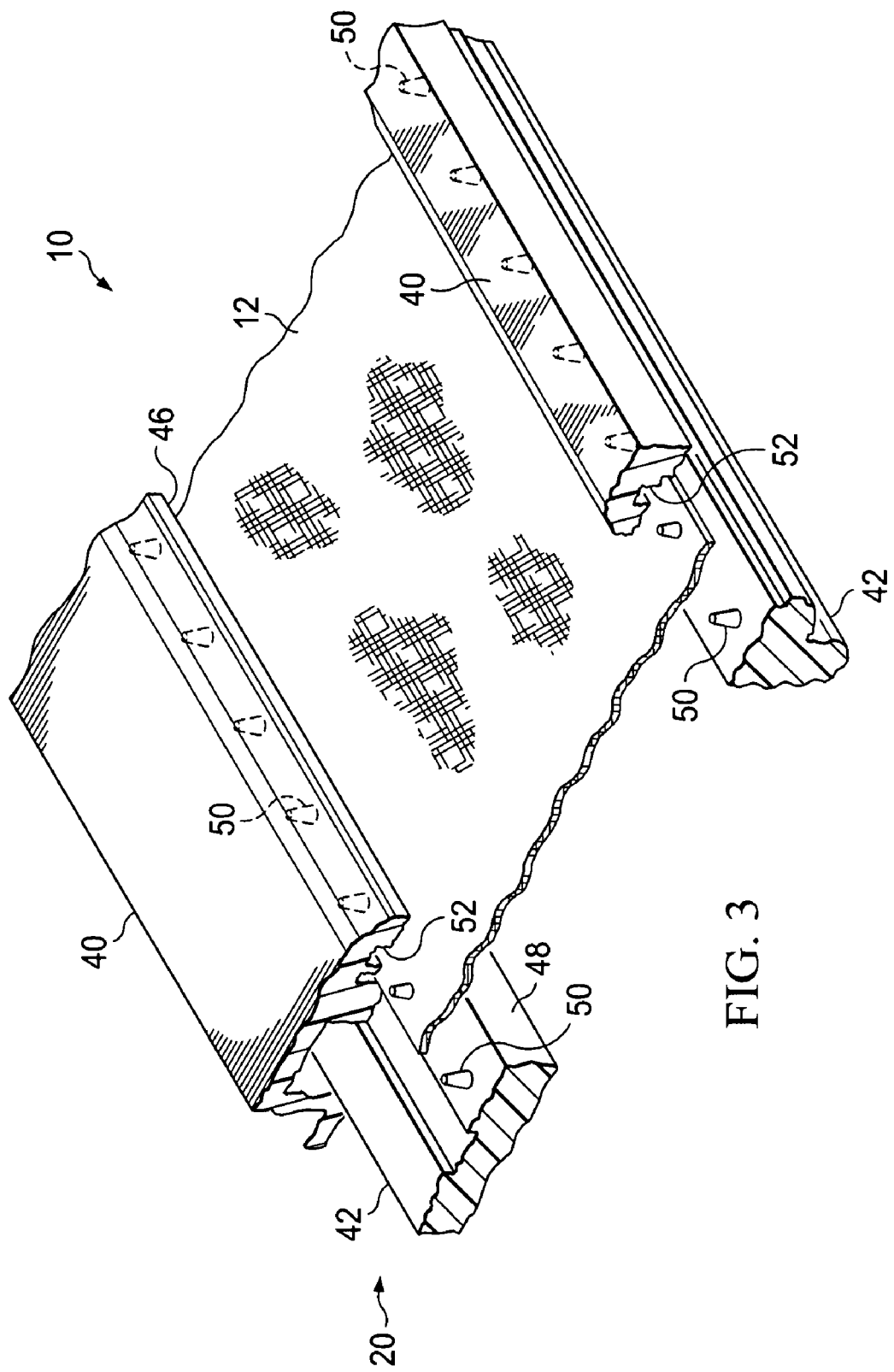
FIG. 3 is a diagram illustrating a section view of the keyboard palm rest assembly of FIG. 1 taken along the line 3-3 of FIG. 1.

FIG. 3 is a diagram illustrating a section view of assembly 10 taken along the line 3-3 of FIG. 1. In the embodiment illustrated in FIG. 3, lower frame member 42 comprises integrally formed, spaced-apart pins 50 extending upwardly toward upper frame member 40, and upper frame member 40 comprises a groove 52 for receiving pins 50 therein when upper and lower frame members 40 and 42 are coupled together. As illustrated in FIG. 3, panel 12 extends across openings 46 and 48 and is secured to upper and lower frame members 40 and 42 using pins 50. For example, in some embodiments, pins 50 extend through a peripheral portion of panel 12 to secure at least a portion of panel 12 between upper and lower frame members 40 and 42, thereby securing panel 12 to frame 20. However, it should be understood that other devices and/or mechanisms may be used to secure panel 12 over and/or across openings 46 and 48 such as, but not limited to, fasteners, adhesives, spot welds, and various types of frictional mechanisms. In some embodiments, instead of groove 52 in upper frame member 40, upper frame member 40 may comprise a plurality of spaced-apart openings into which corresponding pins 50 may be inserted. In some embodiments, pins 50 and corresponding groove 52 may extend around the entire periphery of panel 12 and/or openings 46 and 48. However, it should be understood that the spacing and/or locations of pins 50 and corresponding groove 52 may be otherwise varied. Further, it should be understood that the locations of pins 50 and groove 52 may be reversed (e.g., pins 50 located on upper frame member 40 and groove 52 located on lower frame member 42).

Thus, in some embodiments, panel 12 is installed onto frame 20 by locating at least a portion of panel 12 onto one or more pins 50 (e.g., pins 50 located on one side of opening 48). Panel 12 may be stretched and/or otherwise pulled taut across opening 48 and engaged with pins 50 located on an opposite side of opening 48. Upper frame member 40 is then installed onto lower frame member 42 such that pins 50 are inserted into groove 52, thereby securing the peripheral portion of panel 12 between upper and lower frame members 40 and 42 and across openings 46 and 48 of respective upper and lower frame members 40 and 42.

Figure 4:
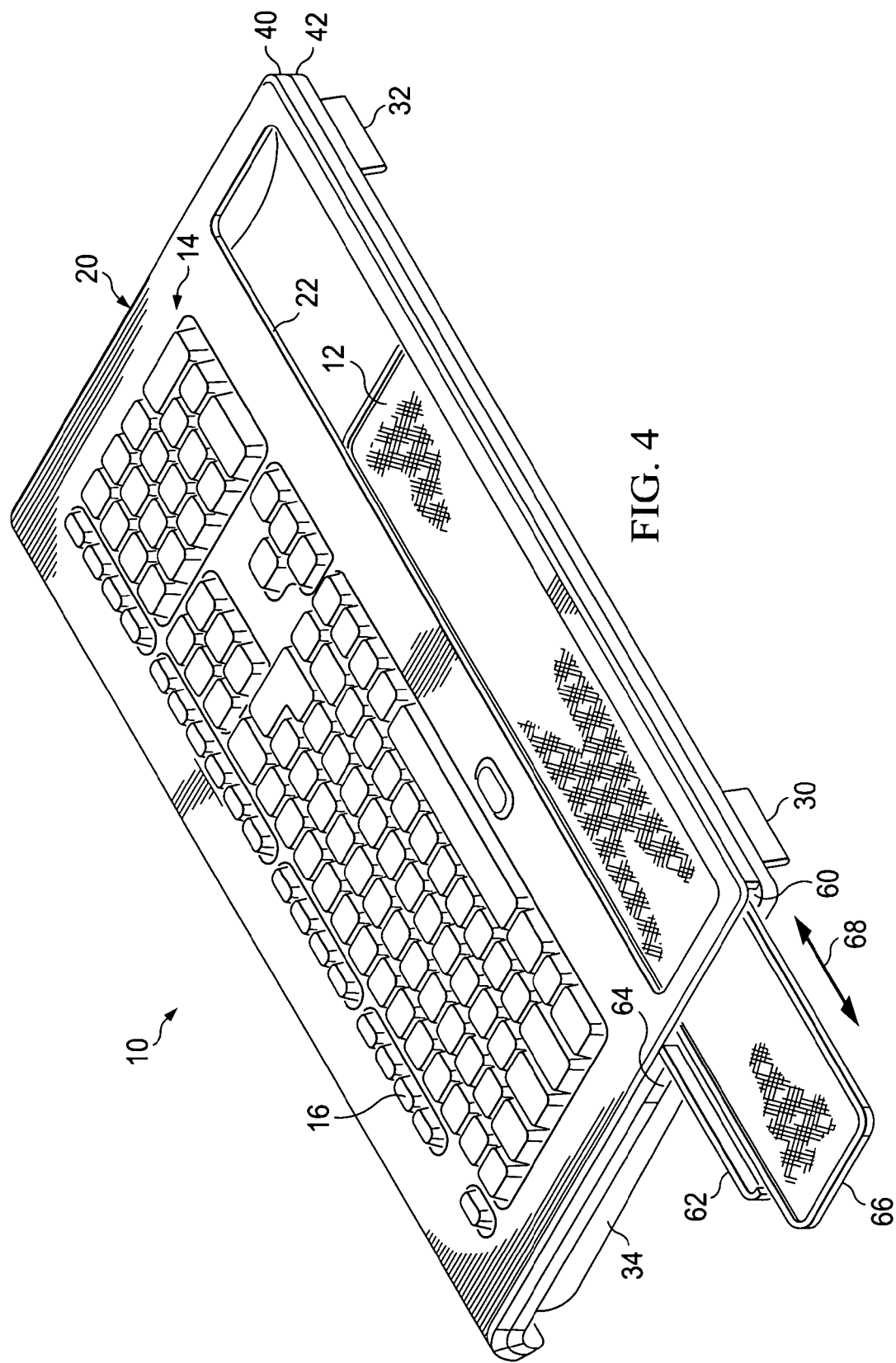
FIG. 4 is a diagram illustrating an embodiment of a keyboard palm rest assembly.

FIG. 4 is a diagram illustrating an embodiment of assembly 10. In the embodiment of assembly 10 illustrated in FIG. 4, frame 20 comprises a slot 60 for receiving slideable insertion of panel 12 therein. For example, in the embodiment illustrated in FIG. 4, upper frame member 40 comprises a door 62 located on a side portion 64 thereof that is openable to facilitate access to slot 60. Slot 60 generally comprises an opening formed between upper and lower frame members 40 and 42 extending laterally along and/or adjacent to opening 22 such that panel 12 may be inserted and/or removed relative to frame 20. For example, in some embodiments, door 62 is rotatably coupled to upper frame member 40 via a hinge or other type of mechanism such that door 62 is openable and closeable relative to slot 60.

In the embodiment illustrated in FIG. 4, panel 12 comprises a peripheral frame 66 that is sized to be inserted into slot 60 such that panel 12 extends across opening 22 when inserted into frame 20. Frame 66 may be formed from a plastic, metallic of other type of material. In operation, panel 12 may be installed into frame 20 by opening door 62 and sliding panel 12 into slot. After insertion of panel 12 into slot 60, door 62 may be closed, thereby securing panel 12 within frame 20 across opening 22. Thus, in the embodiment illustrated in FIG. 4, panel 12 is slideable relative to slot 60 in the directions indicated by arrows 68 to facilitate insertion and/or removal of panel 12 relative to frame 20. Thus, embodiments of assembly 10 illustrated in FIG. 4 enable panel 12 to be removed and cleaned and/or replaced with a new panel 12.

Further, embodiments of assembly 10 enable a variety of different panels 12 to be used in combination with keyboard 14 (e.g., panels 12 may be personalized having a desired logo, sports team insignia, etc., printed and/or otherwise embodied thereon), thereby enabling a user of assembly 10 to personalize their keyboard and/or computing device. Additionally, embodiments of assembly 10 and panel 12 provide a support surface for resting the user's palms thereon while also enabling an airflow to ventilate and/or cool the user's hands.

What is claimed is:

1. A keyboard palm rest assembly, comprising:
    a frame having an opening therethrough, the opening located corresponding to a position of a palm of a user when the user is utilizing a keyboard located adjacent the opening; and
    a fabric panel coupled to the frame and disposed across the opening, the fabric panel enabling an airflow therethrough from a first side of the fabric panel opposite the user's palm to a second side of the fabric panel corresponding to the user's palm,
    wherein the opening extends from the fabric panel through the frame to a side of the frame that is exposed to a region outside the frame to enable the airflow from the region outside the frame through the opening and through the fabric panel,
    wherein the frame comprises a plurality of pins for securing the fabric panel to the frame, wherein the plurality of pins extend through the fabric panel to secure the fabric panel to the frame.

2. The assembly of claim 1, wherein the fabric panel comprises a flexible fabric panel.

3. The assembly of claim 1, wherein a portion of the frame supports the keyboard.

4. The assembly of claim 1, wherein the fabric panel comprises a woven material.

5. A keyboard palm rest assembly, comprising:
    a frame having an opening therethrough, the opening located corresponding to a position of a palm of a user when the user is utilizing a keyboard located adjacent the opening; and
    a fabric panel coupled to the frame and disposed across the opening, the fabric panel enabling an airflow therethrough from a first side of the fabric panel opposite the user's palm to a second side of the fabric panel corresponding to the user's palm,
    wherein the opening extends from the fabric panel through the frame to a side of the frame that is exposed to a region outside the frame to enable the airflow from the region outside the frame through the opening and through the fabric panel,
    wherein the side of the frame that is exposed to the region outside the frame is a bottom side of the frame.

6. The assembly of claim 5, wherein the fabric panel is slidably insertable into the frame.

7. The assembly of claim 5, wherein the opening is a first opening, wherein the frame comprises an upper frame member having a second opening and a lower frame member having the first opening, wherein the fabric panel is disposed between at least a portion of the upper and lower frame members, and wherein the first and second openings are aligned to enable the airflow to pass from the region outside the frame through the first opening, through the fabric panel, and through the second opening.

8. The assembly of claim 5, further comprising at least one support element to elevate the bottom side of the frame to provide an airflow path to enable the airflow.

9. A keyboard palm rest assembly, comprising:
a frame having an opening therethrough, the opening located corresponding to a position of a palm of a user when the user is utilizing a keyboard located adjacent the opening; and
a flexible panel coupled to the frame and disposed across the opening, the flexible panel enabling an airflow through the flexible panel from a first side of the flexible panel opposite the user's palm to a second side of the flexible panel corresponding to the user's palm,
wherein the opening extends from the flexible panel through the frame to a side of the frame that is exposed to a region outside the frame to enable the airflow from the region outside the frame through the opening and through the flexible panel,
wherein the side of the frame that is exposed to the region outside the frame is a bottom side of the frame.

10. The assembly of claim 9, wherein a portion of the frame supports the keyboard.

11. The assembly of claim 9, wherein the flexible panel is slidably insertable into the frame.

12. The assembly of claim 9, wherein the opening is a first opening, wherein the frame comprises an upper frame member having a second opening and a lower frame member having the first opening, wherein the flexible panel is disposed between at least a portion of the upper and lower frame members, and wherein the first and second openings are aligned to enable the airflow to pass from the region outside the frame through the first opening, through the flexible panel, and through the second opening.

13. The assembly of claim 9, wherein the frame comprises a plurality of pins for securing the flexible panel to the frame.

14. The assembly of claim 9, further comprising at least one support element to elevate the bottom side of the frame to provide an airflow path to enable the airflow.

15. A keyboard palm rest assembly, comprising:
a frame having an opening therethrough, the opening located corresponding to a position of a palm of a user when the user is utilizing a keyboard located adjacent the opening; and
a mesh panel disposed across the opening and configured to support the user's palm thereon, the mesh panel enabling an airflow upwardly through the mesh panel to the user's palm,
wherein the opening extends from the mesh panel through the frame to a side of the frame that is exposed to a region outside the frame to enable the airflow from the region outside the frame through the opening and through the mesh panel,
wherein the side of the frame that is exposed to the region outside the frame is a bottom side of the frame.

16. The assembly of claim 15, wherein a portion of the frame supports the keyboard.

17. The assembly of claim 15, wherein the mesh panel is slidably insertable into the frame.

18. The assembly of claim 15, wherein the opening is a first opening, wherein the frame comprises an upper frame member having a second opening and a lower frame member having the first opening, wherein the mesh panel is disposed between at least a portion of the upper and lower frame members, and wherein the first and second openings are aligned to enable the airflow to pass from the region outside the frame through the first opening, through the mesh panel, and through the second opening.

19. The assembly of claim 15, further comprising at least one support element to elevate the bottom side of the frame to provide an airflow path to enable the airflow.

* * * * *